US011920110B2

(12) United States Patent
Backer et al.

(10) Patent No.: US 11,920,110 B2
(45) Date of Patent: Mar. 5, 2024

(54) AUTOMATIC DISHWASHING COMPOSITION WITH DISPERSANT POLYMER

(71) Applicants: Dow Global Technologies LLC, Midland, MI (US); Rohm and Haas Company, Collegeville, PA (US)

(72) Inventors: Scott Backer, Phoenixville, PA (US); Marianne Creamer, Warrington, PA (US); Randara Pulukkody, Landsdale, PA (US); Severine Ferrieux, Grasse (FR)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 470 days.

(21) Appl. No.: 17/272,508

(22) PCT Filed: Oct. 8, 2019

(86) PCT No.: PCT/US2019/055134

§ 371 (c)(1),
(2) Date: Mar. 1, 2021

(87) PCT Pub. No.: WO2020/086257

PCT Pub. Date: Apr. 30, 2020

(65) Prior Publication Data

US 2021/0324304 A1 Oct. 21, 2021

(30) Foreign Application Priority Data

Oct. 22, 2018 (EP) .................................... 18290123

(51) Int. Cl.

| | |
|---|---|
| ***C11D 1/72*** | (2006.01) |
| ***C11D 1/66*** | (2006.01) |
| ***C11D 3/04*** | (2006.01) |
| ***C11D 3/06*** | (2006.01) |
| ***C11D 3/08*** | (2006.01) |
| ***C11D 3/10*** | (2006.01) |
| ***C11D 3/36*** | (2006.01) |
| ***C11D 3/37*** | (2006.01) |
| ***C11D 3/386*** | (2006.01) |
| ***C11D 11/00*** | (2006.01) |

(52) U.S. Cl.

CPC .............. *C11D 3/3761* (2013.01); *C11D 1/66* (2013.01); *C11D 1/72* (2013.01); *C11D 3/046* (2013.01); *C11D 3/08* (2013.01); *C11D 3/10* (2013.01); *C11D 3/361* (2013.01); *C11D 3/3757* (2013.01); *C11D 3/3765* (2013.01); *C11D 3/386* (2013.01); *C11D 11/0023* (2013.01)

(58) Field of Classification Search

CPC .. C11D 1/66; C11D 3/10; C11D 3/046; C11D 3/361; C11D 3/33757; C11D 3/3761; C11D 3/3765; C11D 3/386

USPC ....... 510/223, 224, 226, 230, 469, 477, 505, 510/506, 509

See application file for complete search history.

(56) References Cited

U.S. PATENT DOCUMENTS

| | | | |
|---|---|---|---|
| 4,532,048 | A | 7/1985 | Amjad et al. |
| 4,889,637 | A | 12/1989 | Amjad |
| 5,191,048 | A | 3/1993 | Swift et al. |
| 5,431,846 | A | 7/1995 | Christopher et al. |
| 6,462,006 | B1 | 8/2002 | Sorg et al. |
| 2010/0120650 | A1 | 5/2010 | Pfeiffer et al. |

FOREIGN PATENT DOCUMENTS

| | | | | |
|---|---|---|---|---|
| CA | 2166186 | * | 1/1995 | |
| CA | 2214615 | * | 3/1998 | |
| EP | 3290503 A2 | * | 3/2018 | ......... A47L 15/0007 |

(Continued)

OTHER PUBLICATIONS

Sibilia., "A Guide to Materials Characterization and Chemical Analysis." 1988, p. 81-84.

(Continued)

*Primary Examiner* — Gregory R Delcotto
(74) *Attorney, Agent, or Firm* — Thomas S. Deibert

(57) ABSTRACT

An automatic dishwashing composition is provided including a builder; a phosphonate; a nonionic surfactant; and a dispersant polymer, comprising: structural units of formula I (I)

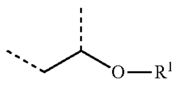

wherein each $R^1$ is independently selected from a hydrogen and a —$C(O)CH_3$ group; and structural units of formula II (II)

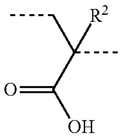

wherein each $R^2$ is independently selected from a hydrogen and a —$CH_3$ group; and wherein the automatic dishwashing composition contains ≤0.1 wt % of dispersant polymer having a lactone end group and wherein the dispersant polymer has a weight average molecular weight of 1,500 to 10,000 Daltons.

10 Claims, No Drawings

(56) References Cited

FOREIGN PATENT DOCUMENTS

| | | |
|---|---|---|
| JP | 04311706 | 11/1992 |
| JP | 09507871 | 8/1997 |
| JP | 09279191 | 10/1997 |
| JP | 2008050410 | 3/2008 |
| WO | 9500623 | 1/1995 |
| WO | 2011080206 | 7/2011 |
| WO | 2018111521 | 6/2018 |
| WO | 2018183010 | 10/2018 |

OTHER PUBLICATIONS

Search Report from corresponding Japanese Application No. 2021517451 dated Jul. 18, 2023.

* cited by examiner

AUTOMATIC DISHWASHING COMPOSITION WITH DISPERSANT POLYMER

The present invention relates to a dispersant polymer for use in automatic dish washing formulations. In particular, the present invention relates to automatic dishwashing compositions incorporating new dispersant polymers having good spotting and/or filming performance.

Automatic dishwashing compositions are generally recognized as a class of detergent compositions distinct from those used for fabric washing or water treatment. Automatic dishwashing compositions are expected by users to produce a spotless and film-free appearance on washed articles after a complete cleaning cycle.

Phosphate-free automatic dishwashing compositions are increasingly desirable. Phosphate-free automatic dishwashing compositions typically rely on non-phosphate builders, such as salts of citrate, carbonate, silicate, disilicate, bicarbonate, aminocarboxylates and others to sequester calcium and magnesium from hard water, and upon drying, leave an insoluble visible deposit.

A family of polycarboxylate copolymers and their use as builders in detergent compositions and rinse aid compositions is disclosed by Christopher et al. in U.S. Pat. No. 5,431,846 for use in the final rinse step of a dish or warewashing machine. Christopher et al. disclose block copolymers comprising from 20 to 95 mole % of monomer units derived from itaconic acid or a homologue thereof and from 5 to 80 mole % of monomer units derived from vinyl alcohol or a lower vinyl ester are excellent binders of divalent or polyvalent metals and are useful as potentially biodegradable builders in detergent compositions as well as in machine dishwashing compositions and anti-scaling rinse compositions.

A family of terpolymers and their use, among other things, as dispersants is disclosed by Swift et al in U.S. Pat. No. 5,191,048. Swift et al teach a terpolymer comprising as polymerized units from about 15 to 55 mole percent of at least one first monomer selected from the group consisting of vinyl acetate, vinyl ethers and vinyl carbonates, from about 10 to 70 mole percent of at least one second monomer of an ethylenically unsaturated monocarboxylic acid, and from about 15 to 55 mole percent of at least one third monomer of an anhydride of a dicarboxylic acid and wherein said terpolymer is formed in a non-aqueous system such that less than about one more percent of the monomers are hydrolyzed during said polymerization.

Notwithstanding there remains a need for new dispersant polymers for use in automatic dish washing formulations. In particular, there remains a need for new dispersant polymers for use in automatic dish washing formulations, wherein the dispersant polymers provide improved spotting and/or filming performance.

The present invention provides an automatic dishwashing composition, comprising: a builder; a phosphonate; a nonionic surfactant; and a dispersant polymer, comprising: (a) 1 to 25 wt % of structural units of formula I (I)

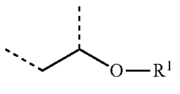

wherein each $R^1$ is independently selected from a hydrogen and a —$C(O)CH_3$ group; and (b) 75 to 99 wt % of structural units of formula II (II)

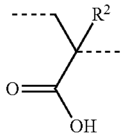

wherein each $R^2$ is independently selected from a hydrogen and a —$CH_3$ group; and wherein the automatic dishwashing composition contains ≤0.1 wt % of dispersant polymer having a lactone end group and wherein the dispersant polymer has a weight average molecular weight of 1,500 to 10,000 Daltons.

The present invention provides a method of cleaning an article in an automatic dishwashing machine, comprising: providing at least one article; providing an automatic dishwashing composition according to the invention; and, applying the automatic dishwashing composition to the at least one article.

DETAILED DESCRIPTION

When incorporated in automatic dishwashing compositions (particularly phosphate-free automatic dishwashing compositions), the dispersant polymer of the present invention as particularly described herein dramatically improve the antispotting performance and filming performance of the automatic dishwashing composition.

Unless otherwise indicated, ratios, percentages, parts, and the like are by weight. Weight percentages (or wt %) in the composition are percentages of dry weight, i.e., excluding any water that may be present in the composition. Percentages of monomer units in the polymer are percentages of solids weight, i.e., excluding any water present in a polymer emulsion.

As used herein, unless otherwise indicated, the terms "weight average molecular weight" and "Mw" are used interchangeably to refer to the weight average molecular weight as measured in a conventional manner with gel permeation chromatography (GPC) and conventional standards, such as polystyrene standards. GPC techniques are discussed in detail in Modem Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. Weight average molecular weights are reported herein in units of Daltons.

The term "ethylenically unsaturated" as used herein and in the appended claims describes molecules having a carbon-carbon double bond, which renders it polymerizable. The term "multi-ethylenically unsaturated" as used herein and in the appended claims describes molecules having at least two carbon-carbon double bonds.

As used herein the term "(meth)acrylic" refers to either acrylic or methacrylic.

The terms "Ethyleneoxy" and "EO" as used herein and in the appended claims refer to a —$CH_2$—$CH_2$—O— group.

The term "phosphate-free" as used herein and in the appended claims means compositions containing ≤1 wt % (preferably, ≤0.5 wt %; more preferably, ≤0.2 wt %; still more preferably, ≤0.01 wt %; yet still more preferably, ≤0.001 wt %; most preferably, less than the detectable limit) of phosphate (measured as elemental phosphorus).

The term "lactone end group dispersant polymer free" as used herein and in the appended claims means automatic dishwashing compositions containing ≤1 wt % (preferably, ≤0.5 wt %; more preferably, ≤0.2 wt %; still more preferably, ≤0.01 wt %; yet still more preferably, ≤0.001 wt %; most preferably, less than the detectable limit) of dispersant polymer having a lactone end group.

The term "structural units" as used herein and in the appended claims refers to the remnant of the indicated monomer; thus a structural unit of (meth)acrylic acid is illustrated:

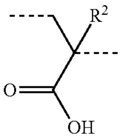

wherein the dotted lines represent the points of attachment to the polymer backbone and where $R^2$ is a hydrogen for structural units of acrylic acid and a —$CH_3$ for structural units of methacrylic acid.

Preferably, the automatic dishwashing composition of the present invention, comprises: a builder (preferably, 1 to 97 wt % (more preferably ≥1 wt %; still more preferably, ≥10 wt %; yet still more preferably, ≥25 wt %; most preferably, ≥50 wt %; preferably, ≤95 wt %; more preferably, ≤90 wt %; still more preferably, ≤85 wt %; most preferably, ≤80 wt %), based on the dry weight of the automatic dishwashing composition, of the builder)(preferably, wherein the builder is selected from the group consisting of carbonate, bicarbonate, citrate, silicate and mixtures thereof); a phosphonate (preferably, 0.1 to 15 wt % (more preferably, 0.5 to 10 wt %; still more preferably, 0.75 to 7.5 wt %; most preferably, 1 to 5 wt %), based on the dry weight of the automatic dishwashing composition, of the phosphonate)(preferably, wherein the phosphonate has a weight average molecular weight of ≤1,000 Daltons); a nonionic surfactant (preferably, 0.2 to 15 wt % (more preferably, 0.5 to 10 wt %; most preferably, 1.5 to 7.5 wt %), based on the dry weight of the automatic dishwashing composition, of the nonionic surfactant)(preferably, wherein the nonionic surfactant is a fatty alcohol alkoxylate); and a dispersant polymer (preferably, 0.5 to 15 wt % (more preferably, 0.5 to 10 wt %; still more preferably, 1 to 8 wt %; most preferably, 2 to 6 wt %), based on the dry weight of the automatic dishwashing composition, of the dispersant) comprising: (a) 1 to 25 wt % (preferably, 2 to 20 wt %; more preferably, 2.5 to 18 wt %; most preferably, 4 to 16 wt %)(preferably, ≥2 wt %; more preferably, ≥2.5 wt %; preferably, ≤25 wt %; more preferably, ≤20 wt %; still more preferably, ≤18 wt %; most preferably, ≤16 wt %) of structural units of formula I (I)

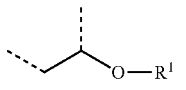

wherein each $R^1$ is independently selected from a hydrogen and a —$C(O)CH_3$ group; and (b) 75 to 99 wt % (preferably, 80 to 98 wt %; more preferably, 82 to 97.5 wt %; most preferably, 84 to 96 wt %)(preferably, ≥75 wt %; more preferably, ≥80 wt %; preferably, ≤99 wt %; more preferably, ≤98 wt %; still more preferably, ≤97.5 wt %; most preferably, ≤96 wt %) of structural units of formula II (II)

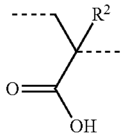

wherein each $R^2$ is independently selected from a hydrogen and a —$CH_3$ group; wherein the automatic dishwashing composition contains ≤0.1 wt % of dispersant polymer having a lactone end group and wherein the dispersant polymer has a weight average molecular weight of 1,500 to 10,000 Daltons (preferably, 2,500 to 8,000 Daltons; more preferably, 4,000 to 7,500 Daltons; most preferably, 4,500 to 6,000 Daltons).

Preferably, the automatic dishwashing composition of the present invention, comprises: a builder. Preferably, the builder used in the automatic dishwashing composition of the present invention, comprises at least one of a carbonate, a citrate and a silicate. Most preferably, the builder used in the automatic dishwashing composition of the present invention, comprises at least one of sodium carbonate, sodium bicarbonate and sodium citrate.

Preferably, the automatic dishwashing composition of the present invention, comprises: 1 to 97 wt % of a builder. Preferably, the automatic dishwashing composition of the present invention, comprises: ≥1 wt % (preferably, ≥10 wt %; more preferably, ≥25 wt %; most preferably, ≥50 wt %) of the builder, based on the dry weight of the automatic dishwashing composition. Preferably, the automatic dishwashing composition of the present invention, comprises: ≤95 wt % (preferably, ≤90 wt %; more preferably, ≤85 wt %; most preferably, ≤80 wt %) of the builder, based on the dry weight of the automatic dishwashing composition. Weight percentages of carbonates, citrates and silicates are based on the actual weights of the salts, including metal ions.

The term "carbonate(s)" as used herein and in the appended claims refers to alkali metal or ammonium salts of carbonate, bicarbonate, percarbonate, and/or sesquicarbonate. Preferably, the carbonate used in the automatic dishwashing composition (if any) is selected from the group consisting of carbonate salts of sodium, potassium and lithium (more preferably, salts of sodium or potassium; most preferably, salts of sodium). Percarbonate used in the automatic dishwashing composition (if any) is selected from salts of sodium, potassium, lithium and ammonium (more preferably, salts of sodium or potassium; most preferably, salts of sodium). Most preferably, the carbonate used in the automatic dishwashing composition (if any) includes at least one of sodium carbonate, sodium bicarbonate and sodium percarbonate. Preferably, when the builder used in the automatic dishwashing composition of the present invention includes carbonate, the automatic dishwashing composition preferably, comprises 0 to 97 wt % (preferably, 5 to 75 wt %; more preferably, 10 to 60 wt %; most preferably 20 to 50 wt %) of carbonate.

The term "citrate(s)" as used herein and in the appended claims refers to alkali metal citrates. Preferably, the citrate used in the automatic dishwashing composition (if any) is selected from the group consisting of citrate salts of sodium, potassium and lithium (more preferably, salts of sodium or potassium; most preferably, salts of sodium). More preferably, the citrate used in the automatic dishwashing composition (if any) is sodium citrate. Preferably, when the builder used in the automatic dishwashing composition of the present invention includes citrate, the automatic dishwashing composition preferably, comprises 0 to 97 wt % (preferably, 5 to 75 wt %; more preferably, 10 to 60 wt %; most preferably 20 to 40 wt %) of the citrate.

The term "silicate(s)" as used herein and in the appended claims refers to alkali metal silicates. Preferably, the silicate used in the automatic dishwashing composition (if any) is selected from the group consisting of silicate salts of sodium, potassium and lithium (more preferably, salts of sodium or potassium; most preferably, salts of sodium). More preferably, the silicate used in the automatic dishwashing composition (if any) is sodium disilicate. Preferably, the builder used in the automatic dishwashing composition of the present invention includes a silicate. Preferably, when the builder used in the automatic dishwashing composition of the present invention includes a silicate, the automatic dishwashing composition preferably, comprises 0 to 97 wt % (preferably, 0.1 to 10 wt %; more preferably, 0.5 to 7.5 wt %; most preferably 0.75 to 3 wt %) of the silicate(s).

Preferably, the automatic dishwashing composition of the present invention comprises 0.1 to 15 wt % (more preferably, 0.5 to 10 wt %; still more preferably, 0.75 to 7.5 wt %; most preferably, 1 to 5 wt %) of a phosphonate. More preferably, the automatic dishwashing composition of the present invention comprises 0.1 to 15 wt % (more preferably, 0.5 to 10 wt %; still more preferably, 0.75 to 7.5 wt %; most preferably, 1 to 5 wt %) of a phosphonate; wherein the phosphonate is a low molecular weight having a weight average molecular weight of ≤1,000 Daltons. Still more preferably, the automatic dishwashing composition of the present invention comprises 0.1 to 15 wt % (more preferably, 0.5 to 10 wt %; still more preferably, 0.75 to 7.5 wt %; most preferably, 1 to 5 wt %) of a phosphonate; wherein the phosphonate comprises at least one of 1-hydroxyethylidene-1,1-diphosphonic acid (HEDP) and a salt of 1-hydroxyethylidene-1,1-diphosphonic acid. Most preferably, the automatic dishwashing composition of the present invention comprises 0.1 to 15 wt % (more preferably, 0.5 to 10 wt %; still more preferably, 0.75 to 7.5 wt %; most preferably, 1 to 5 wt %) of a phosphonate; wherein the phosphonate is selected from the group consisting of 1-hydroxyethylidene-1,1-diphosphonic acid (HEDP) and salts thereof.

Preferably, the automatic dishwashing composition of the present invention, comprises: 0.2 to 15 wt % (preferably, 0.5 to 10 wt %; more preferably, 1.5 to 7.5 wt %), based on the dry weight of the automatic dishwashing composition, of a nonionic surfactant. More preferably, the automatic dishwashing composition of the present invention, comprises: 0.2 to 15 wt % (preferably, 0.5 to 10 wt %; more preferably, 1.5 to 7.5 wt %), based on the dry weight of the automatic dishwashing composition, of the nonionic surfactant, wherein the surfactant comprises a fatty alcohol alkoxylate. Most preferably, the automatic dishwashing composition of the present invention, comprises: 0.2 to 15 wt % (preferably, 0.5 to 10 wt %; more preferably, 1.5 to 7.5 wt %), based on the dry weight of the automatic dishwashing composition, of the nonionic surfactant, wherein the surfactant is a fatty alcohol alkoxylate.

Preferably, the nonionic surfactant used in the automatic dishwashing composition of the present invention has a formula selected from $$RO\text{-}(M)_x\text{—}(N)_y\text{—}OH, \text{ and}$$

$$RO\text{-}(M)_x\text{—}(N)_y\text{—}(P)_z\text{—}OH$$

wherein M represents structural units of ethylene oxide, N represents structural units of $C_{3-18}$ 1,2-epoxyalkane, P represents structural units of $C_{6-18}$ alkyl glycidyl ether, x is 5 to 40, y is 0 to 20, z is 0 to 3 and R represents a $C_{6-22}$ linear or branched alkyl group.

Preferably, the nonionic surfactant used in the automatic dishwashing composition of the present invention has a formula selected from $$RO\text{-}(M)_x\text{—}(N)_y\text{—}OH, \text{ and}$$

$$RO\text{-}(M)_x\text{—}(N)_y\text{—}O\text{—}R'$$

wherein M and N are structural units derived from alkylene oxides (of which one is ethylene oxide); x is 5 to 40; y is 0 to 20; R represents a $C_{6-22}$ linear or branched alkyl group; and R' represents a group derived from the reaction of an alcohol precursor with a $C_{6-22}$ linear or branched alkyl halide, epoxyalkane or glycidyl ether.

Preferably, the nonionic surfactant used in the automatic dishwashing composition of the present invention has a formula $$RO\text{-}(M)_x\text{—}OH$$

wherein M represents structural units of ethylene oxide and x is at least three (preferably, at least five; preferably, no more than ten; more preferably, no more than eight). Preferably, wherein R and R' each have at least eight (more preferably, at least ten) carbon atoms.

Preferably, the automatic dishwashing composition of the present invention, includes a dispersant polymer. More preferably, the automatic dishwashing composition of the present invention, includes: 0.5 to 15 wt %, based on the dry weight of the automatic dishwashing composition, of a dispersant polymer. Still more preferably, the automatic dishwashing composition of the present invention, includes 0.5 to 10 wt %, based on the dry weight of the automatic dishwashing composition, of a dispersant polymer. Yet more preferably, the automatic dishwashing composition of the present invention, includes 1 to 8 wt %, based on the dry weight of the automatic dishwashing composition, of a dispersant polymer. Most preferably, the automatic dishwashing composition of the present invention, includes 2 to 6 wt %, based on the dry weight of the automatic dishwashing composition, of a dispersant polymer.

Preferably, the dispersant polymer used in the automatic dishwashing composition of the present invention comprises 1 to 25 wt % (preferably, 2 to 20 wt %; more preferably, 2.5 to 18 wt %; most preferably, 4 to 16 wt %)(preferably, ≥2 wt %; more preferably, ≥2.5 wt %; preferably, ≤25 wt %; more preferably, ≤20 wt %; still more preferably, ≤18 wt %; most preferably, ≤16 wt %) of structural units of formula I (I)

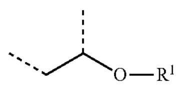

wherein each $R^1$ is independently selected from a hydrogen and a $—C(O)CH_3$ group. More preferably, the dispersant polymer used in the automatic dishwashing composition of the present invention comprises 1 to 25 wt % (preferably, 2 to 20 wt %; more preferably, 2.5 to 18 wt %; most preferably, 4 to 16 wt %)(preferably, ≥2 wt %; more preferably, ≥2.5 wt %; preferably, ≤25 wt %; more preferably, ≤20 wt %; still more preferably, ≤18 wt %; most preferably, ≤16 wt %) of structural units of formula I; wherein $R^1$ is a hydrogen in 0 to 50 mol % of the structural units of formula I in the dispersant polymer.

Preferably, the dispersant polymer used in the automatic dishwashing composition of the present invention comprises 75 to 99 wt % (preferably, 80 to 98 wt %; more preferably, 82 to 97.5 wt %; most preferably, 84 to 96 wt %)(preferably, ≥75 wt %; more preferably, ≥80 wt %; preferably, ≤99 wt %; more preferably, ≤98 wt %; still more preferably, ≤97.5 wt %; most preferably, ≤96 wt %) of structural units of formula II (II)

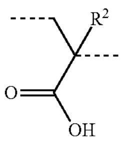

wherein each $R^2$ is independently selected from a hydrogen and a —$CH_3$ group. More preferably, the dispersant polymer used in the automatic dishwashing composition of the present invention comprises 75 to 99 wt % (preferably, 80 to 98 wt %; more preferably, 82 to 97.5 wt %; most preferably, 84 to 96 wt %)(preferably, ≥75 wt %; more preferably, ≥80 wt %; preferably, ≤99 wt %; more preferably, ≤98 wt %; still more preferably, ≤97.5 wt %; most preferably, ≤96 wt %) of structural units of formula II; wherein each $R^2$ is a hydrogen in 75 to 100 mol % (preferably, 85 to 100 mol %; more preferably, 95 to 100 mol %; still more preferably, ≥99 mol %; most preferably, 100 mol %) of the structural units of formula II in the dispersant polymer.

Preferably, the automatic dishwashing composition of the present invention contains ≤1 wt % (preferably, ≤0.5 wt %; more preferably, ≤0.2 wt %; still more preferably, ≤0.01 wt %; yet still more preferably, ≤0.001 wt %; most preferably, less than the detectable limit) of dispersant polymer having a lactone end group. Lactone end groups can form through an internal esterification reaction between a carboxylic acid group on a structural unit of formula II and a terminal hydroxy group derived from certain chain transfer agents (e.g., isopropanol). Most such lactone end groups are γ-lactone.

Preferably, the dispersant polymer used in the automatic dishwashing composition of the present invention has a weight average molecular weight of 1,500 to 10,000 Daltons. More preferably, the dispersant polymer used in the automatic dishwashing composition of the present invention has a weight average molecular weight of 2,500 to 8,000 Daltons. Still more preferably, the dispersant polymer used in the automatic dishwashing composition of the present invention has a weight average molecular weight of 4,000 to 7,500 Daltons. Most preferably, the dispersant polymer used in the automatic dishwashing composition of the present invention has a weight average molecular weight of 4,500 to 6,000 Daltons.

Preferably, the dispersant polymer used in the automatic dishwashing composition of the present invention comprises ≤8 wt % (preferably, ≤5 wt %; more preferably, ≤3 wt %; most preferably, ≤1 wt %) of structural units of esters of (meth)acrylic acid.

Preferably, the dispersant polymer used in the automatic dishwashing composition of the present invention comprises ≤0.3 wt % (more preferably, ≤0.1 wt %; still more preferably, ≤0.05 wt %; yet still more preferably, ≤0.03 wt %; most preferably, ≤0.01 wt %) of structural units of multi-ethylenically unsaturated crosslinking monomer.

Preferably, the dispersant polymer used in the automatic dishwashing composition of the present invention comprises ≤1 wt % (preferably, ≤0.5 wt %; more preferably, ≤0.001 wt %; still more preferably, ≤0.0001 wt %; most preferably, <the detectable limit) of structural units of sulfonated monomer. More preferably, the dispersant polymer used in the automatic dishwashing composition of the present invention comprises ≤1 wt % (preferably, ≤0.5 wt %; more preferably, ≤0.001 wt %; still more preferably, ≤0.0001 wt %; most preferably, <the detectable limit) of structural units of sulfonated monomer selected from the group consisting of 2-acrylamido-2-methylpropane sulfonic acid (AMPS), 2-methacrylamido-2-methylpropane sulfonic acid, 4-styrenesulfonic acid, vinylsulfonic acid, 3-allyloxy sulfonic acid, 2-hydroxy-1-propane sulfonic acid (HAPS), 2-sulfoethyl (meth)acrylic acid, 2-sulfopropyl(meth)acrylic acid, 3-sulfopropyl(meth)acrylic acid, 4-sulfobutyl(meth)acrylic acid and salts thereof. Most preferably, the dispersant polymer used in the automatic dishwashing composition of the present invention comprises ≤1 wt % (preferably, ≤0.5 wt %; more preferably, ≤0.001 wt %; still more preferably, ≤0.0001 wt %; most preferably, <the detectable limit) of structural units of 2-acrylamido-2-methylpropane sulfonic acid (AMPS) monomer.

Preferably, the dispersant polymer used in the automatic dishwashing composition of the present invention is produced by polymerization in water. Preferably, the dispersant polymer is a random copolymer.

Preferably, the dispersant polymer used in the automatic dishwashing composition of the present invention is provided in the form of a water-soluble solution polymer, a slurry, a dried powder, granules or another solid form.

The automatic dishwashing composition of the present invention, optionally further comprises: an additive. Preferably, the automatic dishwashing composition of the present invention, further comprises: an additive selected from the group consisting of an alkaline source; a bleaching agent (e.g., sodium percarbonate, sodium perborate); a bleach activator (e.g., tetraacetylethylenediamine (TAED)); a bleach catalyst (e.g., manganese(II) acetate, cobalt(II) chloride, bis(TACN)magnesium trioxide diacetate); an enzyme (e.g., protease, amylase, lipase, or cellulase); a foam suppressant; a coloring agent; a fragrance; a silicate; an additional builder; an antibacterial agent; a filler; a deposit control polymer and mixtures thereof. More preferably, the automatic dishwashing composition of the present invention, further comprises an additive, wherein the additive is selected from the group consisting of a bleaching agent, a bleach activator, an enzyme, a filler and mixtures thereof. Still more preferably, the automatic dishwashing composition of the present invention, further comprises an additive, wherein the additive includes a bleaching agent (e.g., sodium percarbonate, sodium perborate); a bleach activator (e.g., tetraacetylethylenediamine (TAED)) and an enzyme (e.g., protease, amylase, lipase, or cellulase). Most preferably, the automatic dishwashing composition of the present invention, further comprises an additive, wherein the additive includes a bleaching agent, wherein the bleaching agent includes sodium percarbonate; a bleach activator, wherein the bleach activator includes tetraacetylethylenediamine (TAED); and an enzyme, wherein the enzyme includes a protease and an amylase.

Fillers included in tablets or powders are inert, water-soluble substances, typically sodium or potassium salts (e.g., sodium sulfate, potassium sulfate, sodium chloride, potassium chloride). In tablets and powders, fillers are typically present in amounts ranging from 0 wt % to 75 wt %. Fillers included in gel formulations typically include those mentioned for use in tablets and powders and also water. Fragrances, dyes, foam suppressants, enzymes and antibacterial agents usually total no more than 10 wt %, alternatively no more than 5 wt %, of the automatic dishwashing composition.

The automatic dishwashing composition of the present invention, optionally further comprises: an alkaline source. Suitable alkaline sources include, without limitation, alkali metal carbonates and alkali metal hydroxides, such as sodium or potassium carbonate, bicarbonate, sesquicarbonate, sodium, lithium, or potassium hydroxide, or mixtures of the foregoing. Sodium hydroxide is preferred. The amount of alkaline source in the automatic dishwashing composition of the present invention (if any) is at least 1 wt % (preferably, at least 20 wt %) and up to 80 wt % (preferably, up to 60 wt %), based on the dry weight of the automatic dishwashing composition.

The automatic dishwashing composition of the present invention, optionally further comprises: a bleaching agent (e.g., sodium percarbonate). The amount of the bleaching agent in the automatic dishwashing composition of the present invention (if any) is preferably at a concentration of 1 to 25 wt % (more preferably, 5 to 20 wt %), based on the dry weight of the automatic dishwashing composition.

The automatic dishwashing composition of the present invention, optionally further comprises: a bleach activator (e.g., tetraacetylethylenediamine (TAED)). The amount of the bleach activator in the automatic dishwashing composition of the present invention (if any) is preferably at a concentration of 1 to 10 wt % (more preferably, 2.5 to 7.5 wt %), based on the dry weight of the automatic dishwashing composition.

Preferably, the automatic dishwashing composition of the present invention comprises ≤1 wt % (preferably, ≤0.5 wt %; more preferably, ≤0.2 wt %; still more preferably, ≤0.1 wt %; yet still more preferably, ≤0.01 wt %; most preferably, <the detectable limit), based on the dry weight of the automatic dishwashing composition, of phosphate (measured as elemental phosphorus). Preferably, the automatic dishwashing composition of the present invention is phosphate free.

Preferably, the automatic dishwashing composition of the present invention comprises ≤1 wt % (preferably, ≤0.5 wt %; more preferably, ≤0.2 wt %; still more preferably, ≤0.1 wt %; yet still more preferably, ≤0.01 wt %; most preferably, <the detectable limit), based on the dry weight of the automatic dishwashing composition, of builders selected from the group consisting of nitrilotriacetic acid; ethylenediaminetetraacetic acid; diethylenetriaminepentaacetic acid; glycine-N,N-diacetic acid; methyl glycine-N,N-diacetic acid; 2-hydroxyethyliminodiacetic acid; glutamic acid-N,N-diacetic acid; 3-hydroxy-2,2'-iminodissuccinate; S,S-ethylenediaminedisuccinate aspartic acid-diacetic acid; N,N'-ethylene diamine disuccinic acid; iminodisuccinic acid; aspartic acid; aspartic acid-N,N-diacetic acid; beta-alaninediacetic acid; polyaspartic acid; salts thereof and mixtures thereof. Most preferably, the automatic dishwashing composition of the present invention contains 0 wt % of builders selected from the group consisting of nitrilotriacetic acid; ethylenediaminetetraacetic acid; diethylenetriaminepentaacetic acid; glycine-N,N-diacetic acid; methyl glycine-N,N-diacetic acid; 2-hydroxyethyliminodiacetic acid; glutamic acid-N,N-diacetic acid; 3-hydroxy-2,2'-iminodissuccinate; S,S-ethylenediaminedisuccinate aspartic acid-diacetic acid; N,N'-ethylene diamine disuccinic acid; iminodisuccinic acid; aspartic acid; aspartic acid-N,N-diacetic acid; beta-alaninediacetic acid; polyaspartic acid; salts thereof and mixtures thereof.

Preferably, the automatic dishwashing composition of the present invention has a pH (at 1 wt % in water) of at least 9 (preferably, ≥10; more preferably, ≥11.5). Preferably, the automatic dishwashing composition of the present invention has a pH (at 1 wt % in water) of no greater than 13.

Preferably, the automatic dishwashing composition of the present invention can be formulated in any typical form, e.g., as a tablet, powder, block, monodose, sachet, paste, liquid or gel. The automatic dishwashing compositions of the present invention are useful for cleaning ware, such as eating and cooking utensils, dishes, in an automatic dishwashing machine.

Preferably, the automatic dishwashing composition of the present invention are suitable for use under typical operating conditions. For example, when used in an automatic dishwashing machine, typical water temperatures during the washing process preferably are from 20° C. to 85° C., preferably 30° C. to 70° C. Typical concentrations for the automatic dishwashing composition as a percentage of total liquid in the dishwasher preferably are from 0.1 to 1 wt %, preferably from 0.2 to 0.7 wt %. With selection of an appropriate product form and addition time, the automatic dishwashing compositions of the present invention may be present in the prewash, main wash, penultimate rinse, final rinse, or any combination of these cycles.

Preferably, the method of cleaning an article in an automatic dishwashing machine of the present invention, comprises: providing at least one article (e.g., cookware, bakeware, tableware, dishware, flatware and/or glassware); providing an automatic dishwashing composition of the present invention; and applying the automatic dishwashing composition to the at least one article (preferably, in an automatic dishwasher).

Some embodiments of the present invention will now be described in detail in the following Examples.

The weight average molecular weight, Mw; number average molecular weight, MN; and polydispersity (PDI) values reported in the Examples were measured by gel permeation chromatography (GPC) on an Agilent 1100 series LC system equipped with an Agilent 1100 series refractive index. Samples were dissolved in HPCL grade THF/FA mixture (100:5 volume/volume ratio) at a concentration of approximately 9 mg/mL and filtered through at 0.45 μm syringe filter before injection through a 4.6×10 mm Shodex KF guard column, a 8.0×300 mm Shodex KF 803 column, a 8.0×300 mm Shodex KF 802 column and a 8.0×100 mm Shodex KF-D column. A flow rate of 1 mL/min and temperature of 40° C. were maintained. The columns were calibrated with narrow molecular weight PS standards (EasiCal PS-2, Polymer Laboratories, Inc.).

Examples 1-4: Synthesis of Dispersant Polymer

In Example 1 to a glass reactor equipped with an overhead stirrer, a nitrogen bubbler, a pressure controller, a reflux condenser and a temperature controller was added deionized water (250 g) and an iron (II) sulfate solution (2.5 g, 0.15%). The temperature controller set point was set at 73° C. The overhead stirrer was set at 173 rpm. Then sodium metabisulfite (SMBS) (1.35 g) in deionized water (10 g) was added to the reactor contents. Then, the addition to the reactor contents of cofeeds was initiated with (a) a monomer cofeed containing glacial acrylic acid (255 g) and vinyl acetate (45 g) in deionized water (50 g) at a flow rate of 3.8 g/min. (over 90 minutes); (b) an initiator cofeed containing sodium persulfate (NaPS)(2 g) in deionized water (50 g) at a flow rate of 0.55 g/min (over 95 minutes); and (c) a chain transfer agent cofeed containing SMBS (28.68) in deionized water (60 g) at a flow rate of 1.11 g/min (over 80 minutes). After completion of all the cofeeds, the reactor contents were held for 15 minutes, a chase containing NaPS (0.42 g) in deionized water (20 g) was added to the reactor contents over 10 minutes. After completion of the chase, the reactor contents were held for 20 minutes, before adding a second chase containing NaPS (0.42 g) in deionized water (20 g) over 10 minutes; followed by another 20 minute hold. Then the reactor was removed from the heating source and allowed cool. The polymer product obtained was then measured at 41.6 wt % solids. A 50% NaOH solution was added to achieve a final pH of 5.56. The process was then repeated for Examples 2-4 with changes in the monomer feeds to reflect that reported in TABLE 1. The pH, % solids, weight average molecular weight, Mw, of the polymers produced in each of Examples 1-4 was then measured with the results provided in TABLE 1.

TABLE 1

| Ex. | Monomer Feed composition (wt %) Vinyl Acetate | Acrylic Acid | pH | Solids (%) | Weight average molecular weight |
|---|---|---|---|---|---|
| 1 | 15 | 85 | 5.56 | 38.5 | 5,767 Daltons |
| 2 | 5 | 95 | 5.26 | 39.1 | 5,156 Daltons |
| 3 | 10 | 90 | 5.27 | 39.1 | 5,208 Daltons |
| 4 | 20 | 80 | 5.44 | 38.5 | 7,130 Daltons |

Procedure for Preparing Food Soil

The STIWA food soil described in TABLE 2 was prepared by the following procedure.

a) Bringing the water to a boil.
b) Mixing in a paper cup the instant gravy, the benzoic acid and the starch; and then adding the mixture to the boiling water.
c) Adding the milk and margarine to the product of (b).
d) Letting the product of (c) cool down to approximately 40° C., and then adding mixture to a kitchen mixer (Polytron).
e) Combining in another paper cup, the egg yolk, the ketchup and the mustard and mixing with a spoon.
f) Adding the product of (e) to the mixture of (d) in the blender with continuous stirring.
g) Letting the product of (f) stir in the blender for 5 minutes.
h) The freezing the product food soil mixture from (g).
i) 50 g of the frozen slush is placed into the dishwasher at beginning of the main wash.

TABLE 2

| Ingredient | Weight, g |
|---|---|
| Water | 700 |
| Margarine | 100 |
| Gravy Powder | 25 |
| Potato Starch | 5 |
| Benzoic Acid | 1 |
| Egg Yolk | 57 |
| Mustard | 25 |

TABLE 2-continued

| Ingredient | Weight, g |
|---|---|
| Ketchup | 25 |
| Milk | 50 |

Comparative Examples DC1-DC2 and Example D1-D4: Dishwashing Compositions

Dishwashing compositions were prepared in each of Comparative Examples DC1-DC2 and Example D1 having the component formulations identified in TABLE 3. The protease used in each of the component formulations was Savinase® 12T protease available from Novozymes. The amylase used in each of the component formulations was Stainzyme® 12T amylase available from Novozymes.

TABLE 3

| Ingredient | Concentration on solids basis (wt %) DC1 | DC2 | D1 | D2 | D3 | D4 |
|---|---|---|---|---|---|---|
| Sodium Citrate | 30 | 30 | 30 | 30 | 30 | 30 |
| Sodium Carbonate | 25 | 25 | 25 | 25 | 25 | 25 |
| Percarbonate | 15 | 15 | 15 | 15 | 15 | 15 |
| TAED | 4 | 4 | 4 | 4 | 4 | 4 |
| Sodium Disilicate[a] | 2 | 2 | 2 | 2 | 2 | 2 |
| Sodium Sulfate | 9 | 9 | 9 | 9 | 9 | 9 |
| Nonionic Surfactant[b] | 5 | 5 | 5 | 5 | 5 | 5 |
| HEDP[c] | 2 | 2 | 2 | 2 | 2 | 2 |
| Amylase | 1 | 1 | 1 | 1 | 1 | 1 |
| Protease | 2 | 2 | 2 | 2 | 2 | 2 |
| Dispersant Polymer[d] | 5 | — | — | — | — | — |
| Dispersant Polymer[e] | — | 5 | — | — | — | — |
| Example 1 | — | — | 5 | — | — | — |
| Example 2 | — | — | — | 5 | — | — |
| Example 3 | — | — | — | — | 5 | — |
| Example 4 | — | — | — | — | — | 5 |

[a]Britesil® H20 hydrous sodium silicate available from PQ Corporation.
[b]Dowfax ™ 20B102 nonionic linear alcohol alkoxylate available from The Dow Chemical Company.
[c]Dequest ™ 2010 organophosphonate available from Italmatch Chemicals S.p.A.
[d]Acusol ™ 588 dispersant (polyacrylate copolymer) available from The Dow Chemical Company.
[e]Acusol ™ 445N dispersant (polyacrylic acid polymer) available from The Dow Chemical Company.

Dishwashing Test Conditions

Machine: Miele SS-ADW, Model G1222SC Labor. Wash at 65° C.-30 min, prewash. Water: 37° fH hardness, Ca:Mg=3:1. Food soil: 50 g of the composition noted in TABLE 2 was introduced to the wash liquor frozen in a cup. Each dishwashing composition from Comparative Examples DC1-DC2 and Examples D1-D4 were tested, dosed at 20 g per wash.

Glass Tumbler Filming and Spotting Evaluation

After each of 10 wash cycles, 20 wash cycles and 30 wash cycles under the above dishwashing test conditions, the glass tumblers were dried in open air. After drying in open air filming and spotting ratings were determined by trained evaluators by observations of glass tumblers in a light box with controlled illumination from below. Glass tumblers were rated for filming and spotting according to ASTM method ranging from 1 (no film/spots) to 5 (heavily filmed/spotted). An average value of 1 to 5 for filming and spotting was determined as reported in TABLE 4.

TABLE 4

| Composition | Filming cycles 10 | 20 | 30 | Spotting cycles 10 | 20 | 30 |
|---|---|---|---|---|---|---|
| Comp. Example DC1 | 1.5 | 2.0 | 2.5 | 4.0 | 5.0 | 5.0 |
| Comp. Example DC2 | 2.0 | 2.0 | 2.5[a] | 1.0 | 1.0 | 1.0 |
| Example D1 | 2.5 | 1.5 | 1.5 | 3.0 | 3.0 | 1.0 |
| Example D2 | 2.5 | 1.5 | 1.5 | 2.0 | 2.0 | 1.0 |
| Example D3 | 2.5 | 1.5 | 1.5 | 3.0 | 3.0 | 2.0 |
| Example D4 | 2.0 | 1.5 | 1.5 | 3.0 | 4.0 | 2.0 |

[a]Film observed to have a noticeable blue tint, indicative of a calcium phosphonate and/or a magnesium silicate film formation viewed negatively by consumers as more noticeable than other films Stainless Steel Filming and Spotting Evaluation After 30 wash cycles under the above dishwashing test conditions, the stainless steel plates were dried in open air. After drying in open air filming and spotting ratings were determined by trained evaluators by observations of the stainless steel plates in a light box with controlled illumination. Stainless steel plates were rated for filming and spotting according to ASTM method ranging from 1 (no film/spots) to 5 (heavily filmed/spotted). An average value of 1 to 5 for filming and spotting was determined as reported in TABLE 5.

TABLE 5

| Composition | Filming | Spotting |
|---|---|---|
| Comp. Example DC1 | 1 | 1 |
| Comp. Example DC2 | 4 | 1 |
| Example D1 | 2 | 1 |
| Example D2 | 2 | 1 |
| Example D3 | 2 | 1 |
| Example D4 | 2 | 1 |

We claim:

1. An automatic dishwashing composition, comprising:

a builder;

a phosphonate;

a nonionic surfactant; and a dispersant polymer, comprising:

(a) 2 to 20 wt % of structural units of formula I (I)

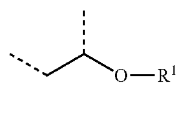

wherein each $R^1$ is independently selected from a hydrogen and a —$C(O)CH_3$ group; and (b) 82 to 98 wt % of structural units of formula II (II)

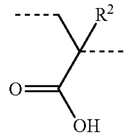

wherein each $R^2$ is independently selected from a hydrogen and a —$CH_3$ group; wherein the dispersant polymer comprises ≤1 wt % of structural units of sulfonated monomer; and wherein the automatic dishwashing composition contains ≤0.1 wt % of dispersant polymer having a lactone end group and wherein the dispersant polymer has a weight average molecular weight of 1,500 to 10,000 Daltons.

2. The automatic dishwashing composition of claim 1, wherein the automatic dishwashing composition contains ≤0.01 wt % of dispersant polymer having a lactone end group; and wherein the dispersant polymer comprises ≤0.5 wt % of structural units of sulfonated monomer.

3. The automatic dishwashing composition of claim 2, wherein the builder is selected from the group consisting of carbonate, bicarbonate, citrate, silicate and mixtures thereof.

4. The automatic dishwashing composition of claim 3, wherein each $R^2$ is a hydrogen in 75 to 100 mol % of the structural units of formula II in the dispersant polymer.

5. The automatic dishwashing composition of claim 4, wherein the automatic dishwashing composition contains less than 0.1 wt % phosphate, measured as elemental phosphorus.

6. The automatic dishwashing composition of claim 5, wherein the automatic dishwashing composition contains 0 wt % of builders selected from the group consisting of nitrilotriacetic acid; ethylenediaminetetraacetic acid; diethylenetriaminepentaacetic acid; glycine-N,N-diacetic acid; methyl glycine-N,N-diacetic acid; 2-hydroxyethyliminodiacetic acid; glutamic acid-N,N-diacetic acid; 3-hydroxy-2, 2'-iminodissuccinate; S,S-ethylenediaminedisuccinate aspartic acid-diacetic acid; N,N'-ethylene diamine disuccinic acid; iminodisuccinic acid; aspartic acid; aspartic acid-N,N-diacetic acid; beta-alaninediacetic acid; polyaspartic acid; salts thereof and mixtures thereof.

7. The automatic dishwashing composition of claim 6, further comprising an additive.

8. The automatic dishwashing composition of claim 7, wherein the additive is selected from the group consisting of a bleaching agent, a bleach activator, an enzyme, a filler, and mixtures thereof.

9. The automatic dishwashing composition of claim 8, further comprising an additive, wherein the additive comprises a mixture of a bleaching agent; a bleach activator and an enzyme.

10. A method of cleaning an article in an automatic dishwashing machine, comprising:

providing at least one article;

providing an automatic dishwashing composition according to claim 1; and, applying the automatic dishwashing composition to the at least one article.

* * * * *